(12) United States Patent
Bvn

(10) Patent No.: US 8,861,867 B2
(45) Date of Patent: Oct. 14, 2014

(54) REUSE OF IMAGE PROCESSING INFORMATION

(75) Inventor: Pavan Kumar Bvn, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 26 days.

(21) Appl. No.: 13/572,347

(22) Filed: Aug. 10, 2012

(65) Prior Publication Data

US 2014/0247980 A1 Sep. 4, 2014

Related U.S. Application Data

(63) Continuation of application No. 12/191,676, filed on Aug. 14, 2008, now Pat. No. 8,265,380.

(51) Int. Cl.
*G06K 9/62* (2006.01)
*G06K 9/00* (2006.01)

(52) U.S. Cl.
USPC ............................................... 382/209

(58) Field of Classification Search
CPC . G06T 7/0081; G06T 7/40; G06T 2207/0079; G06K 9/38; G06K 9/342; H04N 1/622
USPC ......... 382/164, 167, 172–173, 209, 218–220, 382/224, 254, 274, 275, 278; 358/1.9, 3.27, 358/3.28, 464, 515, 518, 525, 530, 537; 348/157, 592, 660, 671, 708; 345/589, 345/601, 639
See application file for complete search history.

(56) References Cited

U.S. PATENT DOCUMENTS

| 4,439,759 | A | * | 3/1984 | Fleming et al. | 345/601 |
|---|---|---|---|---|---|
| 4,977,398 | A | * | 12/1990 | Pleva et al. | 345/639 |
| 5,289,297 | A | * | 2/1994 | Bollman et al. | 358/537 |
| 6,509,935 | B1 | * | 1/2003 | Busby et al. | 348/592 |
| 7,257,272 | B2 | * | 8/2007 | Blake et al. | 382/275 |
| 8,265,380 | B1 | * | 9/2012 | Bvn | 382/164 |
| 8,345,102 | B2 | * | 1/2013 | Huang et al. | 348/157 |
| 2008/0025638 | A1 | * | 1/2008 | Chen et al. | 382/284 |
| 2008/0253660 | A1 | * | 10/2008 | Matsushita et al. | 382/190 |
| 2008/0285859 | A1 | * | 11/2008 | Lei et al. | 382/224 |

* cited by examiner

*Primary Examiner* — Amir Alavi
(74) *Attorney, Agent, or Firm* — Kilpatrick Townsend & Stockton LLP

(57) ABSTRACT

A content editor application receives a reference map that indicates which portions of a first image are foreground, and which portions of the first image are background. The content editor compares a coloration of regions in the first image to a coloration of regions in the second image. For regions in the second image that match a coloration of corresponding regions in the first image, or that are within a threshold range of coloration, the content editor uses the reference map to mark regions of the second image that are foreground and to mark which regions of the second image are background. Accordingly, the reference map of the first image can be used to identify whether regions of a second image or subsequent images in a sequence are foreground and which are background.

10 Claims, 9 Drawing Sheets

REUSE OF IMAGE PROCESSING INFORMATION

CROSS-REFERENCES TO RELATED APPLICATIONS

This application is a continuation of U.S. patent application Ser. No. 12/191,676, filed Aug. 14, 2008, now, U.S. Pat. No. 8,265,380 entitled "Reuse of Image Processing Information," the entirety of which is hereby incorporated by reference.

BACKGROUND

Chroma key, or chroma key effect, is a process for mixing two images or frames together, in which a color—or a range of colors—from one image becomes transparent for viewing portions of a different background image instead of an original background associated with the image.

Mixing such an image having transparent regions with a second image creates a composite image. This technique is commonly used to replace a first background with a second background. For example, one or more portions of a first image can be overlaid on a second image to make it appear as though a subject of the first image was originally taken with respect to a background of the second image. In other words, the chroma key effectively keys out or removes all image pixels that are similar to a specified background key color so that the keyed out color, or range of colors, becomes transparent for the entire clip.

One common use of the chroma key process is with weather forecasts. In such applications, a person presenting a weather forecast on television appears to be standing in from of a large weather map. In reality, that is, in the broadcast studio, the weather presenter is standing in front of a large blue or green background. When televising the weather forecast, the blue or green background is keyed out according to conventional techniques and replaced with a weather map or graphical forecast.

Another common use of the chroma key process is in creating special effects in motion pictures. Actors are filmed in front of a greenscreen or bluescreen. (Any color screen can be used, but filmmakers prefer green and blue since these colors are the colors least like skin tone.) During processing of the video images, the background screen is removed, and then replaced with another background such a computer-generated landscape.

Professional, amateur, and hobby filmmakers all can use conventional chroma key techniques to create special effects in video and other types of imaging applications.

SUMMARY

Conventional processes of keying out colors, or a range of colors, suffer from a number of deficiencies. For example, a background screen such as a green screen or a blue screen used for chroma keying may not be perfectly uniform in color, lumination, etc. That is, the material used to make a background may not be perfectly smooth, or it may vary from matte to glossy. Also, camera and lighting effects can contribute to or exacerbate imperfections in a background material.

When filming, these background imperfections can result in small shadows or bright spots that do not match a color key, or exceed a color key range. For example, amateur or hobby filmmakers commonly use a cloth as a chroma key background. This background cloth might have folds, creases, wrinkles, faded portions, and the like. Thus, the cloth material itself may be woven and may not be perfectly smooth.

Use of a low cost or imperfect background such as a cloth material having imperfections as discussed above can result in small shadows scattered throughout the background area of images. The shadows of the cloth represent so-called artifacts of the background that should be removed from an image, but which may not be removed by conventional processing techniques because the artifacts are outside a specified color range associated with the background. If the background artifacts are not identified and removed from an image, the result will be a low quality overlay of a foreground subject on a new background.

Identifying and removing such shadows or artifacts from background images is typically a computationally intensive process. Upon keying out a color or color range from a first image, the resulting image yields areas that are either identified as foreground, or as potential foreground areas. Thus, the resulting image will usually contain one or more areas which a film editor desires to keep (such as actors), and several shadows or small artifacts as mentioned above that the film editor desires to remove, such as shadows in the background.

These artifacts can number from less than a few when using a good chroma key background to several hundreds or thousands of undesirable artifacts when using a low quality chroma key background.

To identify so-called artifacts such as, for example, areas of an image that appear to be a foreground object but in fact are part of a background, a processor analyzes the image(s). For example, the processor can be configured to calculate an area of each of the potential foreground areas in an image, and compare each area to a threshold size to identify whether each area under test is an artifact. If the area is smaller than a predetermined threshold, then the area may be identified as an artifact and marked as background or made transparent. Calculating and replacing artifacts can be a heavy computational task that reduces editing efficiency, especially in applications such as, for example, video processing in which subject matter of frames of one video are superimposed on a background frames of a second video. For example, according to conventional techniques, each frame in a video sequence must be analyzed to identify so-called artifacts that are really background but appear to be foreground.

Techniques discussed herein significantly overcome the deficiencies of conventional image and video editing applications. For example, as will be discussed further, certain specific embodiments herein are directed to a computer and/or image processing environments that dramatically improve the efficiency of removing undesirable artifacts in a chroma key image editing process.

More specifically, according to one embodiment, a content editor receives a reference map or mask that indicates which portions of a first image are foreground, and which portions of the first image are background. By way of a non-limiting example, such portions of the first image that are considered to be background can include pixels, groups of pixels, areas on an image grid, etc. In one embodiment, the content editor compares regions in the first image to regions in a second image. For regions in the second image that match a parameter such as, for example, coloration of corresponding regions in the first image, or that are within a threshold range of coloration, the content editor uses the reference map (associated with the first image) to mark which regions of the second image that are foreground and to mark which regions of the second image are background. Thus, according to embodiments herein, if a region of the first image is identified as an artifact and is considered to be background as specified by a corresponding foreground/background reference map, portions of the second image having the same artifacts (because of a matching) can be marked as background as well based on the reference map without having to apply heavy amounts of processing to the second image to again identify artifacts as was done for the first image to produce the reference map.

Accordingly, processing of a first image can be used to create a map or mask that takes into account or identifies artifacts in the first image. The map of artifacts can be applied to one or more other images to find and remove artifacts.

Based on these and other embodiments as further described herein, a content editor, creating a chroma key effect, can more efficiently process a second or subsequent image. For example, the content editor reuses the computationally intensive process of removing artifacts from the first image, for use with the second or subsequent images, to mark regions or pixels as background. In other words, the content editor skips an area-based artifact removal computation for subsequent images—that are similar to the first image—and reuses the reference map to mark probable artifacts as background in the subsequent images. This is especially useful for slower computer processors and/or when the reference map can be used for any number of subsequent frames such as 10, 20, 30, or more, subsequent frames or images.

An example advantage of using the reference map for multiple subsequent images is that the content editor can process video for chroma key effects in a fraction of time otherwise necessary. In other words, one benefit of the invention is more optimized video processing because the reference map, which indicates where imperfections were found in a first image, is reused to identify imperfections in the second image and possibly other images. This means that heavy processing need not be employed to identify and then remove artifacts in the second image. For example, in many cases, the artifacts found in a first image of a video sequence are similar to the artifacts present in one or more subsequent images of the video sequence because the sequence of images often does not change quickly over time. Thus, artifacts in one image are the same as artifacts in a subsequent image. Creation and use of the map thus reduces an amount of time required to find unwanted artifacts that appear to be foreground but are actually background.

Also by way of a non-limiting example, note that the coloration comparison as discussed above can include a comparison of any of one or more properties such as numerical color identifier values, luminance level values, a level of saturation, etc. to make a determination whether the regions in a first image match regions in a second image.

In one embodiment, a content editor receives a reference map, or mask, indicating which portions of the first image are foreground and which portions of the first image are background. In this reference mask, any background artifacts from the first image (such as shadows) have already been removed or marked as background. The content editor compares a coloration of regions in the first image to a coloration of regions in the second image by detecting whether a region of the first image is within a threshold range of coloration with respect to a corresponding same region in the second image. For example, the content editor compares corresponding pixels of a first and second image to identify whether the pixels have a same or similar coloration within a corresponding threshold value.

In one embodiment, the threshold range of coloration can be user-configured such that a user or other source can specify limits as to whether portions of the second image match. Setting a larger threshold may result in improved efficiency, while setting a smaller threshold may result in improved quality.

When performing the comparison as discussed above, according to an example embodiment, the content editor can be configured to identify regions in the second image that match, within a threshold range, the coloration of corresponding regions in the first image. For such matching regions, the content editor uses the reference map to mark regions of the second image as foreground or background. Thus, portions of the first image identified as artifacts can be identified as artifacts in the second image.

In one embodiment, the content editor can generate a mask or foreground/background map associated with the second image. In such an embodiment, the mask indicates which regions of the second image are foreground and which regions are background. Just as the reference map indicates which portions of the first image are foreground and background, the mask associated with the second image indicates which portion of the second image are foreground and background.

The content editor also can identify regions in the second image having a coloration difference from corresponding regions in the first image, or a coloration difference that exceeds a predetermined threshold. For such regions with a coloration difference, the content editor can identify whether those regions have a respective coloration within a background coloration range associated with the second image. When the non-matching regions have a respective coloration within the background coloration range, the content editor marks such regions in the second image as background. When the non-matching regions do not have a respective coloration within the background coloration range, the content editor marks such regions as foreground.

In accordance with another embodiment, the content editor analyzes attributes of a first image to create a first mask that indicates which regions of the first image represent foreground and which regions of the first image represent background. The first mask can serve as a reference map as discussed above. The first mask also can serve as a template indicating which portions of the first image are foreground and which are background. As mentioned above, the first mask can be created to identify artifacts that appear to be foreground but which are more likely background. Based on an analysis of the second image using the first mask or so-called reference map, the content editor creates a second mask indicating which regions of the second image are foreground and which regions of the second image represent background.

In this analysis, the content editor may initially derive parameter information for each of the first image and second image and compare the information to conditionally perform operations of creating the second mask based on use of the first mask or, as an alternative, derive the second mask based on a more burdensome process of identifying which regions of the second image are foreground. Such parameter information can include luminance, color saturation level, brightness, contrast, prominent background color, etc. derived from analyzing each of the images as a whole. For example, as further discussed below, the content editor generates parameter information for each of the first image and one or more other images including the second image. Using threshold value information, the content editor determines whether the first image has attributes or color parameters similar to the second image. In one embodiment, if color parameters between the first and second images are sufficiently different, then artifact/aberration removal analysis from the first image will not be used for the second image. In other words, if the difference in color parameters, between the two images, is above or greater than a predetermined threshold level, it is likely that the artifacts found in the first image will not be the same as the artifacts in the second image. In such an instance, the mask or reference map associated with the first image is therefore not used to create a mask identifying artifacts in the second image. Otherwise, there could be a loss of quality by reusing a reference mask calculated from frame one and applying it to a subsequent frame.

If the images have similar characteristics indicating that the images are very similar, the content editor initiates the process as discussed above. For example, for frame one, the content editor generates a reference map that indicates which regions of the first image are not of a background color but which are aberrations to be marked as background in the first image. When color parameters between the first and second images are within the threshold amount, then the content editor uses this generated reference map to create a second mask indicating which regions of the second image are foreground in which regions of the second image represent background.

In addition to the example method, system, etc. embodiments as discussed above, other embodiments herein can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a content editor and/or related functions as explained herein to carry out different embodiments as described herein.

Yet other embodiments herein include software programs to perform the steps and operations summarized above and disclosed in detail below. One such embodiment comprises a computer program product that has a computer-readable medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer readable media having instructions stored thereon for supporting operations such as analysis and processing of images for a chroma key effect. The instructions, and method as described herein, when carried out by a processor of a respective computer device, cause the processor to: (1) receive a reference map or mask indicating which portions of a first image are foreground and which portions of the first image are background; (2) compare a coloration of regions in the first image to a coloration of regions in a second image; and (3) for regions in the second image matching, within a threshold range, a coloration of corresponding regions in the first image, use the reference map to mark or identify which regions of the second image are foreground and to mark or identify which regions of the second image are background. As mentioned above, reuse of the reference map or mask associated with the first image when processing the second image reduces the amount of time required to carry out image processing in applications such as, for example, chroma key applications.

Another particular embodiment of the present disclosure is directed to a computer program product that includes a computer readable medium having instructions stored thereon for supporting operations such as processing of video content. Such instructions, and thus method as described herein, when carried out by a processor of a respective computer device, cause the processor to: (1) analyze attributes of a first image; (2) based on such analysis, create a first mask indicating which regions of the first image represent foreground and which regions of the first image represent background; and (3) based on an analysis of the first mask with respect to a second image, create a second mask indicating which regions of the second image are foreground and which regions of the second image represent background.

Other embodiments of the present disclosure include software programs to perform any of the method embodiment steps and operations summarized above and disclosed in detail below.

Of course, the order of discussion of the above steps has been presented for clarity sake. In general, these steps may not need to be performed in any particular order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting image and video processing and editing. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the dif

DETAILED DESCRIPTION

According to one embodiment, a content editor receives a reference map that indicates which portions of a first image are foreground, and which portions of the first image are background. By way of a non-limiting example, such portions can include pixels, groups of pixels, areas on an image grid, etc. The content editor compares a coloration of regions in the first image to a coloration of regions in the second image. For regions in the second image that match a coloration of corresponding regions in the first image, or that are within a threshold range of coloration, the content editor uses the reference map to mark regions of the second image that are foreground and to mark which regions of the second image are background. Accordingly, the reference map or mask associated with the first image can be used to identify which regions of one or more subsequent images are foreground and which are background.

Figure 1:
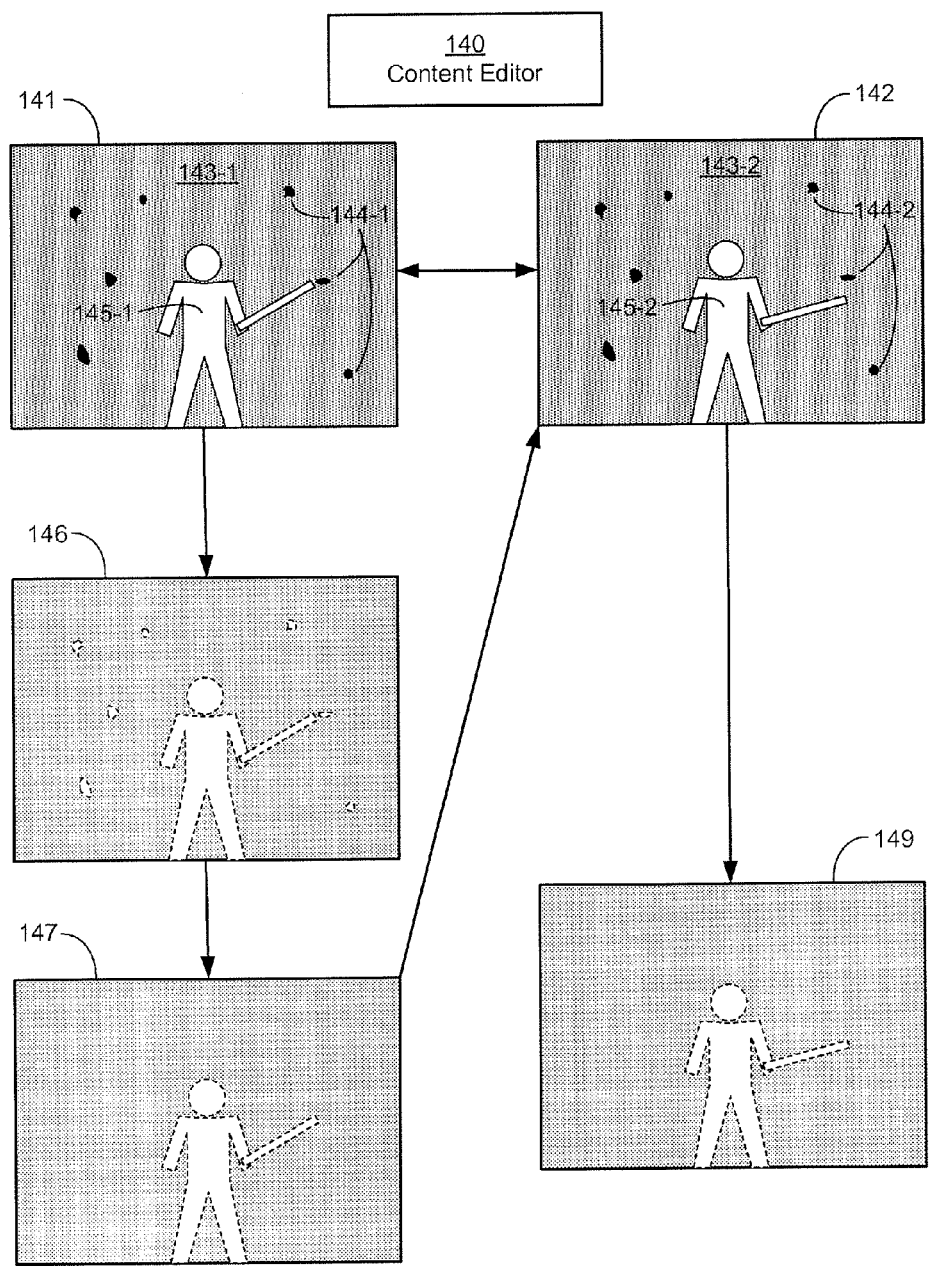
- FIG. 1 is an example diagram of a content editor for processing of images in a computer/network environment according to embodiments herein.

Now, more specifically, FIG. 1 is an example diagram illustrating a content editor 140 configured to process images according to embodiments herein. Image 141 is a first image to be processed. Image 142 is a second image to be processed. Within example image 141 there is background 143-1. Background 143-1 is a shaded area that represents a background generally composed of a single color. In other words, background 143-1 represents a green screen or blue screen used in chroma key image capture or filming.

In reality, background 143-1 may not be composed of a single color because of imperfections in the background material used as a backdrop when capturing the image 141. For example, the background 143-1 associated with image 141 can vary depending on lighting variations, color variations, limitations in image capturing equipment, shadows on the material background, etc.

As mentioned above, the background 143-1 can include artifacts that are really part of the background but which appear to be foreground because they are outside of a background color range.

These imperfections result is shadows within the background 143-1. Shadows and aberrations in the background material or surface are especially common when filming with low-quality background materials. For example, a hobbyist movie maker may hang a cloth or colored bed sheet as a background. Such cloth material might be folded or crumpled resulting in a non-uniform surface. These small imperfections will result in small shadows or bright spots in the background material when filming.

Image 141 shows several shadows 144-1 (artifacts) scattered throughout background 143. Shadows 144 are not intended to be displayed to scale. Also note that there could be many more shadows with a given background that are very small with respect to foreground areas.

Foreground area 145-1 of image 141 depicts a person holding a stick.

Image 142 may be nearly identical to image 142 because the two images can be taken at approximately the same time such as, for example, one after the other. In one embodiment, image 141 and image 142 are frames of a video Moving from image 141 to 142, the shadows remain (or generally remain) in the same location, while the person in the foreground moves the end of the stick slightly down. For example, the unwanted artifacts such as shadows 144-1 of image 141 appear generally in the same corresponding areas as the shadows 144-2 in image 142.

Additionally, shadows are simply used as an example. In general, the shadows 144 can be any type of aberration in the background.

When using a green background, a video camera typically will capture shadows as blackish green, or black. Both of these colors are most likely outside a (background) color key range used to positively identify whether a corresponding pixel of a respective image is background or not. Because the shadows 144-1 or artifacts are outside of a background color range, the content editor 140 must perform further processing to determine whether the artifacts are background or foreground.

Note that a background in a respective image may also have extremely bright portions, which a video camera captures as whitish green, or white. Both of these colors are also most likely outside the color key range such that content editor 140 may not be able to accurately mark these as background.

According to one embodiment, the content editor 140 produces a provisional map 146 indicating which regions of the image 141 are foreground and which are background. For example, the provisional map 146 can be generated by analyzing each element or pixel in image 141 to identify whether it falls within a background color range or not. If a respective element of image 141 falls within a background color range, the element is marked as being background. If the respective element of image 141 is outside of the background color range, the respective element is provisionally marked as being foreground.

In this initial chroma keying process, content editor 140 either generates this provisional map 146, or receives this provisional image map from a separate content editor 140. In the embodiment of generating provisional map 146, content editor 140 identifies probable foreground and background regions based on a color or color range. In other words, content editor 140 keys image 141 to an identified color or color range of background 143 to identify and mark regions or pixels within image 146 as either foreground or background. As mentioned above, this is a provisional step because there will be areas identified as foreground which, in reality, should be marked as background or transparent.

Provisional map 146 shows background 143 marked as background, which is represented by shading. Provisional map 146 also shows provisionally marked foreground areas, which include both shadows 144 and foreground area 145.

Provisional map 146 depicts the provisionally marked foreground areas as white circles with a dotted line. Artifacts in provisional map 146 are shadows identified as foreground. In one embodiment, the content editor 140 initiates further processing to remove unwanted artifacts from image 141. In other words, the content editor 140 performs further processing on provisional map 146 to identify portions of the image 141 that are actually background even though they were provisionally labeled as foreground in provisional map 146. Otherwise, if provisional map 146 were used as a mask, the undesirable shadows and/or artifacts in image 141 will be transferred or mixed in with a second background.

To generate reference map 147, which is a more accurate mask indicating which portions of image 141 are foreground voltage background, content editor 140 identifies boundaries of foreground regions in provisional map 146. Next, content editor 140 calculates an area for each region identified as foreground. Calculating an area size for each potential foreground region in provisional reference map 146, enables content editor 140 to identify artifacts. For example, if the size of each area such as, for example, a contiguous grouping of pixels is smaller than a predetermined threshold, then content editor 140 can mark such regions in reference map 147 as being background.

In one embodiment, the threshold area can be defined as a percentage of the overall image size, and may be very small compared to the overall image size, such as less than 1% of the overall image size. It is likely that such small portions of the image are artifacts in the image 141 as opposed to an area of interest to be superimposed on a new background during the chroma key process.

When performing the analysis of foreground regions in provisional map 146, the content editor 140 may identify contiguous groupings of pixels that are larger than a threshold value. In such an instance, the content editor 140 can perform additional analyses to identify whether the provisionally labeled foreground is either foreground or background. For example, the content editor 140 can check whether a grouping of pixels under test is very near in color to the background color range for the image. If the area under test is near the background color range, the content editor 140 can conclude that the area under test is an artifact that is really background rather than foreground. Such areas (groupings of pixels in the image 141 generally close to but outside the background color range) can then be marked as being background in reference map 147.

Certain parts of image 141 will not be identified as artifacts and therefore will be marked as foreground. For example, the foreground area 145 is larger than a threshold value and may include colors quite different than the background color range for the image 141. Thus, content editor 140 would not mark these areas as being background in reference map 147.

The artifact removal process as discussed above results in reference map 147. Reference map 147 properly identifies foreground object 145 as being foreground and shadows 144-1 as being background. Calculating reference map 147 completes processing for image 141.

Content editor 140 can perform a pre-processing check to determine whether image 141 and image 142 are similar to each other. If so, the reference map 147 derived for image 141 can be used to generate reference map 149.

In general reference map 149 is a mask indicating which portions of image 142 are foreground and which portions are background. As discussed herein, using the reference map 147 at least in part to generate reference map 149 reduces processing time because alternatively generating the reference map 149 in a similar manner as generating reference map 147 can be quite tedious.

More specifically, according to one embodiment, processing for image 142 begins by comparing color parameters of image 141 with color parameters of image 142. Color parameters can include a color histogram, average luminance of an overall image, average saturation color of the complete image, etc. for each of the images. Each of these parameters can be derived by the content editor 140 based on an analysis of the images.

As mentioned above, the color comparison performed by content editor 140 can include verifying that image 141 and image 142 are sufficiently similar such that the reference map 147 can be used with image 142 to produce reference map 149. If content editor 140 determines that the color difference between image 141 and image 142 is not similar, then content editor 140 will need to separately calculate a reference map for image 142 just as the content editor 140 generated the reference map 147 for image 141 as discussed above.

Content editor 140 can use thresholds, or color parameter thresholds, to determine a degree of similarity between image 141 and image 142. For example, if a difference between a color histogram from image 141 and a color histogram from image 142 is greater than a predetermined threshold value amount, then content editor 140 identifies the two images as not sufficiently similar. Alternatively, in determining image similarity, content editor 140 can be configured to only consider saturation or luminance levels within a background color range. In other words, colors containing skin tone levels, or similar saturation levels, can be omitted from the analysis of whether the images are sufficiently similar to each other.

When the color comparison verifies that image 141 and image 142 are sufficiently similar, the content editor 140 uses reference map 147 (as well as further processing) to generate reference map 149.

In one embodiment, regions or pixels identified as artifacts and marked as background and reference map 147 are used to mark regions or pixels of reference map 149 as background. For example, content editor 140 compares each pixel within image 142 to a pixel at a same respective location in image 141 to calculate a coloration difference. The process implemented by the content editor 140 can include comparing the first pixel in image 141 to the first pixel in image 142, comparing the second pixel of image 141 to the second pixel in image 142, and so on.

For each pixel under test, if there is no coloration difference between a pixel in image 141 and a respective pixel in image 142, or if the difference in coloration is below a predetermined threshold, then content editor 140 marks such pixels of reference map 149 identical to a foreground or background marking of reference map 147.

Between image 141 and image 142 there most likely will be some pixels having a color difference between the two images as a result of an object of interest moving in the images. For such pixels having a coloration difference between images, content editor 140 executes a color keying process similar to that which generated provisional image map 146. That is, content editor 140 compares pixels having a coloration difference against a background color or color range, and then marks pixels accordingly. Thus, content editor 140 skips or omits the tedious process step (as discussed above) of calculating areas of foreground objects to remove artifacts for image 142. Skipping this step is very useful to avoid heavy computational processing that is time-consuming.

Assuming that a position of the example person holding the stick in image 141 is in a nearly a same position as in image 142, pixels having a coloration difference will most likely be within or around a region of foreground area 145. For example, it is possible that between one frame and a subsequent frame or image, foreground area 145 representing a corresponding object in the image may move relative to background 143 such that a portion of background 143 that was previously covered by foreground area 145 is now revealed. It is also possible that within the newly revealed background region there are shadows or other artifacts. Such newly appearing shadows or artifacts may not be discovered as artifacts and properly marked as background in second or subsequent image processing. There may be a small quality loss associated with omitting area-based artifact computation for every frame, but the trade-off is a dramatic increase in video editing efficiency. In other words, as discussed above, using the reference map 147 at least in part to generate reference map 149 reduces processing time because alternatively generating the reference map 149 in a similar manner as generating reference map 147 can be quite tedious.

Figure 2:
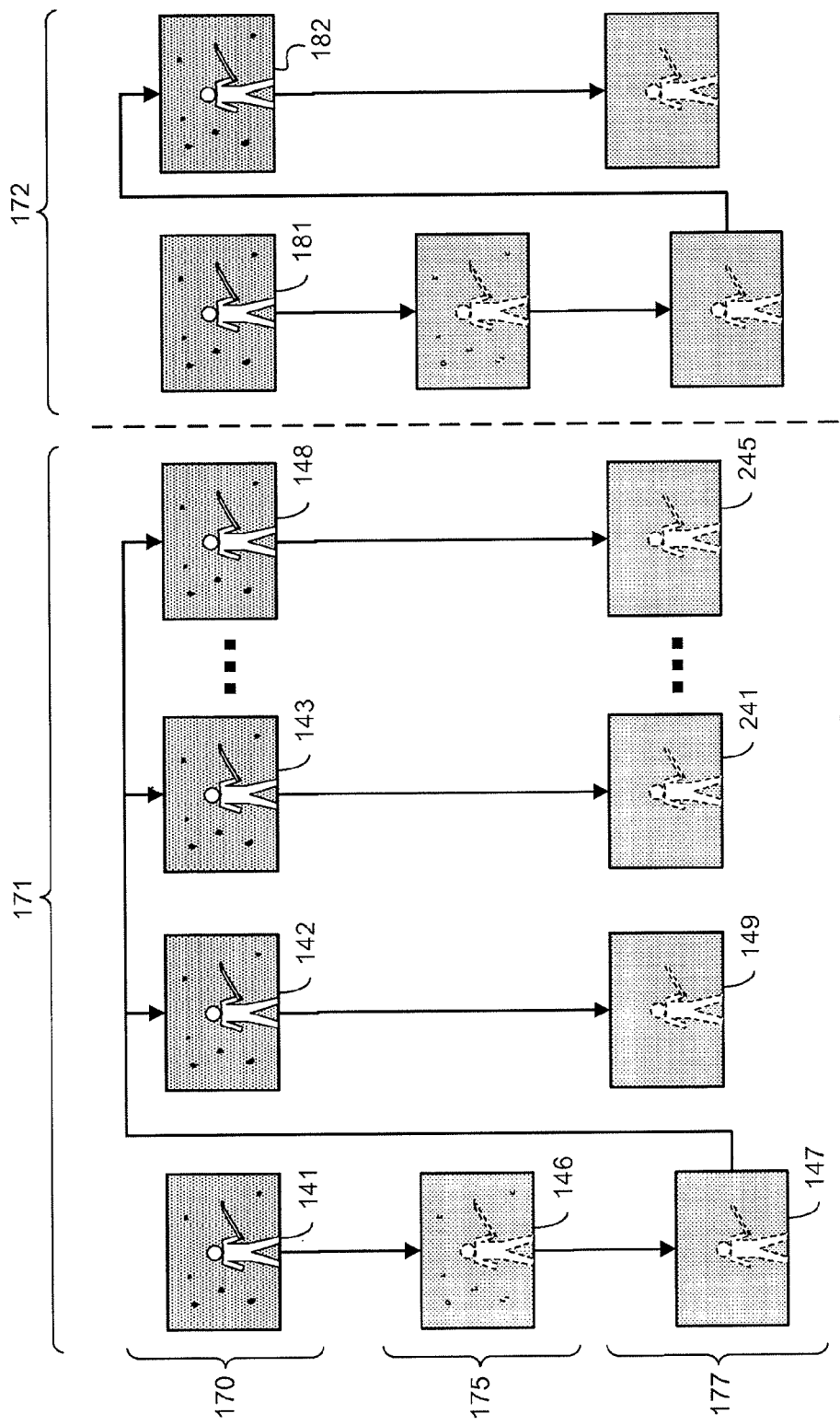
FIG. 2 is an example diagram of a content editor processing a sequence of images according to embodiments herein.

FIG. 2 illustrates how content editor 140 processes a sequence of images according to embodiments herein. In general, FIG. 2 illustrates how a reference map 147 generated from a single image such as, for example, image 141 can be used to produce reference maps such as reference map 149, reference map 241, etc. for each of multiple subsequent images. In a similar manner as discussed above, if image 143 is similar to image 141, then content editor 140 performs a similar process as discussed above to generate reference map 241 indicating foreground and background matter associated with image 143.

Now, more specifically, the sequence of images 170 can include frames of recorded video. Each image such as image 141, 142, 143, . . . , 149 in the sequence of images 170 can represent a frame of video.

As shown, sequence of images 170 can be separated into two sequences, a first sequence 171, and a second sequence 172. Each of sequences 171, and 172 can have two or more frames or images. Also note that there can be hundreds of frames in any given sequence, but preferably each sequence group is limited to a manageable such as, for example, a few dozen images.

Row 175 displays provisional reference maps calculated from a first image in each sequence of images. As discussed above, to generate a provisional mapping of foreground and background in a respective image, content editor 140 generates such provisional reference paths by comparing each region or pixel in frame 141 with a background color, or color range, and marks regions as either foreground or background.

Next, in a manner as previously discussed, content editor 140 calculates sizes of foreground areas to identify artifacts in the background screen to mark as background and reference map 147.

Prior to generating a corresponding reference map for subsequent image 143 and other images in the sequence, the content editor 140 performs an analysis as discussed above to verify that image 143 is similar to image 141. Each of images 142, 143, . . . , 149 are compared with image 141 to verify the color parameters are sufficiently similar.

If a subsequent image is sufficiently similar based on the comparison test, content editor 140 applies reference map 147 to each of images 142, 143, . . . , 149 to generate a corresponding reference mask for each subsequent image. Thus, the analysis of identifying artifacts for a first image or reference image such as, for example, image 141 need not be repeated for each subsequent image in the sequence.

Sequence 172 illustrates how content editor 140 can use this process. In other words, content editor 140 passes on or reuses a reference map for a given image in the sequence of images 170 to improve efficiency by reducing processor load.

When processing a sequence of many frames or images, content editor 140 does not continuously skipping a process of recalculating a reference image. For example, the artifact information captured in reference map 147 will eventually become stale because the foreground image will change over time. To accommodate for such a condition, the tedious process of identifying artifacts can be repeated every Nth frame. In other words, the image at a beginning of a sequence can be used to generate a respective reference map, which is then applied to other images in the sequence to determine which portions of the subsequent images in a sequence are artifacts.

Thus, in addition to the color parameter comparison to verify that two images are sufficiently similar to omit calculating a reference map, content editor 140 also considers a predetermined threshold, equal to a number of subsequent frames, beyond which content editor 140 will recalculate a reference map despite having each of subsequent images with a coloration parameter range. By way of a non-limiting example, the content editor 140 can be configured to recalculate a reference image map every so often such as, for example, every 30th frame.

Also, note that if the content editor 140 detects a substantial change from a reference image and a subsequent image in a sequence, the content editor 140 can initiate application of the more tedious process of identifying artifacts as is done for each first image in a sequence. For example, the image in a sequence can change substantially such that content editor 140 initiates generation of a provisional reference map and refined reference map before the 30th frame.

As previously discussed, chroma keying is a process for mixing two images or frames together, in which a color—or a range of colors—from one image becomes transparent for viewing portions of a different background image instead of an original background associated with the image.

Embodiments herein enable mixing foreground image portions derived from sequence of images 170 onto a new background such as a background other than the original background associated with images 141, 142, etc. in sequence of images 170.

For example, according to embodiments herein, the content editor application 140 can be configured to: overlay foreground regions (as identified by mask 149) of the image 142 onto a background different than the original background region associated with image 142; overlay foreground regions (as identified by mask 241) of the image 142 onto a background different than the original background region associated with image 143; overlay foreground regions (as identified by mask 245) of the image 148 onto a background different than the original background region associated with image 148.

Each of the foreground image portions in sequence of images 170 can be overlaid on a static image or an image background that changes over time.

Thus, based on the techniques as described herein, the foreground image portions in sequence 170 can be overlaid onto a second image to make it appear as though foreground matter in sequence 170 was originally taken with respect to a background of another static image, sequence of moving images, etc. In other words, the process of chroma keying as described herein can include keying out or removing all image pixels that are specified as background so that the keyed out color, or range of colors, in the foreground becomes transparent for viewing a respective new background.

Figure 3:
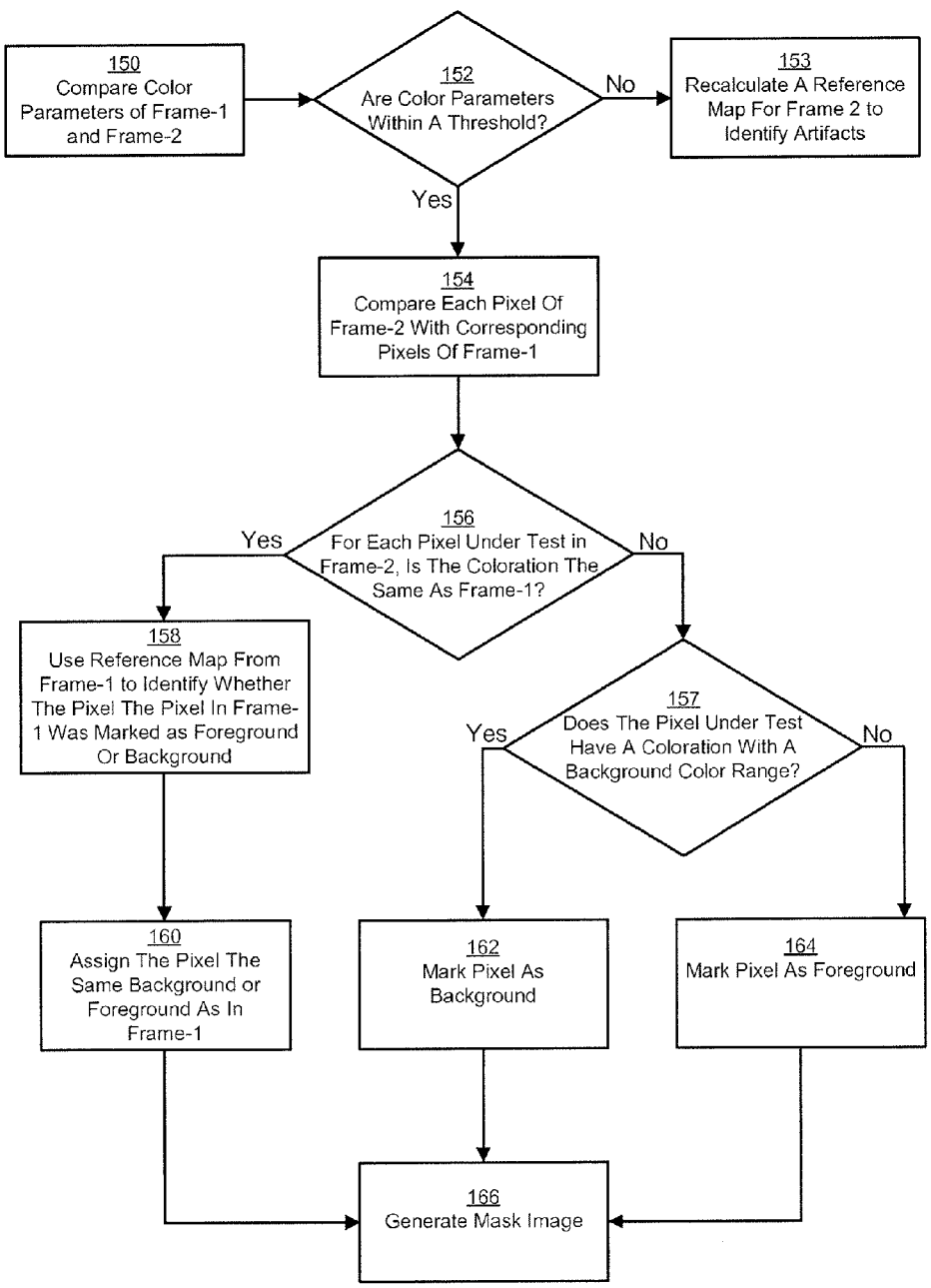
FIG. 3 is a flow chart illustrating example decision logic in editing image content according to embodiments herein.

FIG. 3 is a flow chart illustrating example decision logic for execution by content editor 140 according to embodiments herein. In general, the flowchart recites a process of utilizing a reference map generated for a first image to remove artifacts found in a second image.

In step 150, content editor 140 compares color parameters of a first and second frame. Such color parameters can include a color histogram of each frame. Other parameters for comparison can include average luminance and average saturation level of each frame, or any other color metrics. As discussed above, content editor 140 can analyze any color parameter, or any combination of color parameters, between frames. Content editor 140 determines whether a difference between color parameters of the first and second frame is within a predetermined threshold amount (step 152). Setting a higher threshold yields better image processing efficiency and a small decrease or loss of quality. Such a loss of quality is generally imperceptible to viewers. The decision process of steps 150 and 152 is a type of pre-processing check.

If the color parameter difference exceeds a threshold, then content editor 140 recalculates a reference map for a second or subsequent frame to identify artifacts in area-based analysis of foreground objects (step 153). As previously discussed, this can be a tedious task requiring substantial processing resources. A color parameter difference that exceeds a threshold could indicate a drastic change between images, which would result in a loss of quality.

When a color parameter difference of images is within a threshold, content editor 140 continues image processing by comparing each pixel of the second or subsequent frame to a corresponding pixel of the first frame (step 154). For each pixel under test in the second frame, content editor 140 identifies whether a coloration is the same as a corresponding pixel in the first frame (step 156). In other words, this step can include a pixel-by-pixel analysis to identify color differences between corresponding pixels. A content editor that follows a Red Green Blue (RGB) color model has numerical color identifiers for each pixel available to quickly identify differences.

For pixels with a matching coloration, which can include cases where a coloration difference between pixels is below a threshold, content editor 140 continues to step 158 and uses a reference map from the first frame to identify whether such pixels have a corresponding pixel in frame one marked as background or foreground. Content editor 140 assigns each such pixel the same background or foreground mark as that in the reference map from the first frame (step 160) to generate a mask image 166. Such a mask image is used as a reference to identify which pixels in each frame should be transparent when mixed with a separate background or foreground image to produce a chroma key effect.

For pixels with a coloration difference, content editor 140 continues with a background color comparison process to step 157. In step 157, content editor 140 determines whether each pixel under test has a coloration within a background color range. The background color, or color range, can be specified identified by a user. For example, a user identifies a background area or background color that the user desires to remove. Alternatively, content editor 140 automatically determines the background color. In the latter case in which the content editor 140 implements automatic detection, content editor 140 identifies the most common or prominent color within an image and identifies this color as background.

For such pixels within the background color range for the image, content editor 140 marks these pixels as background (step 162). For such pixels that exceed a background coloration range, content editor 140 marks these pixels as foreground (step 164). Content editor 140 combines this foreground and background analysis, with a reference map-based pixel assignments from step 160, to generate mask image 166.

This process is repeated for each pixel to produce the foreground/background mappings.

Figure 4:
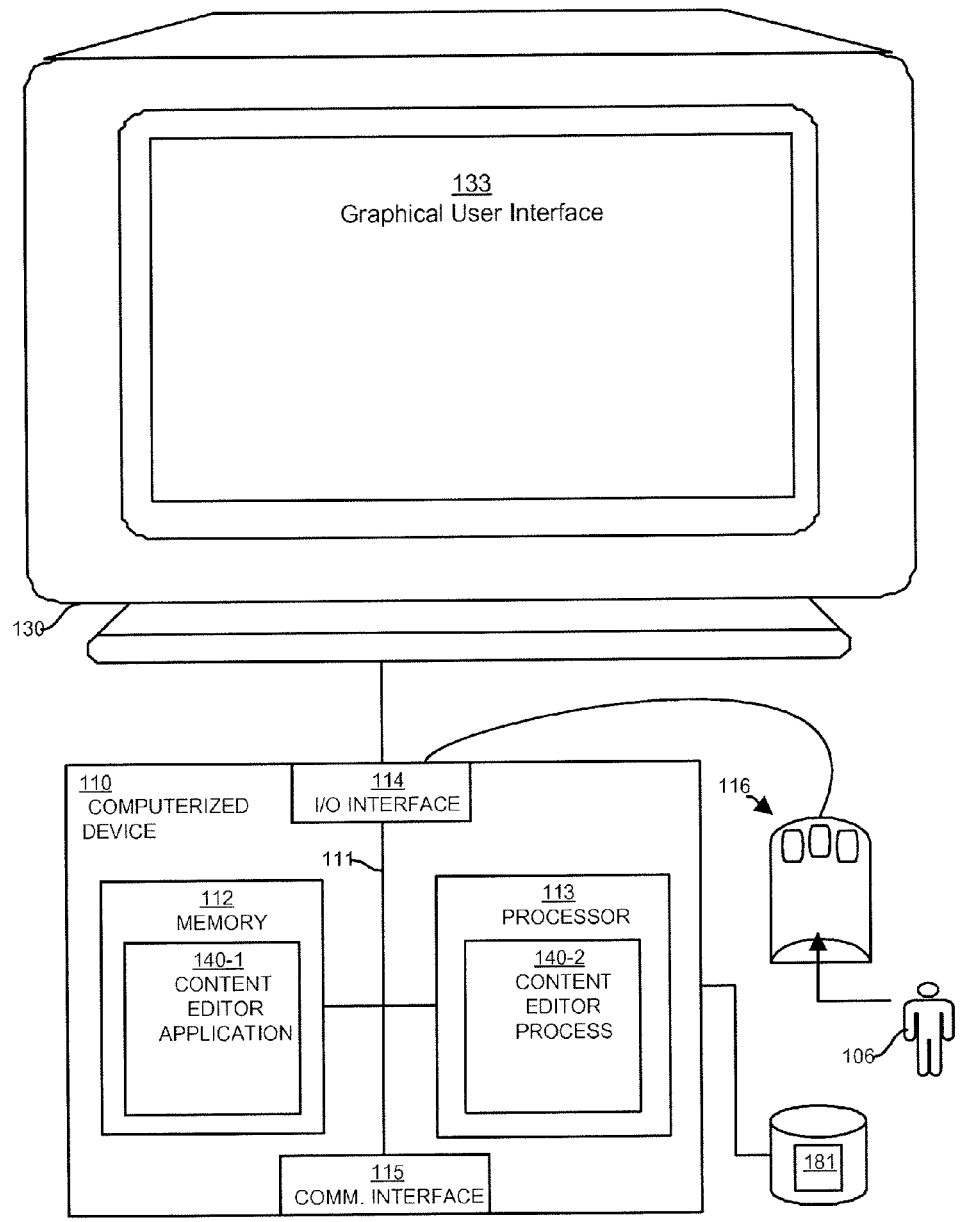
FIG. 4 is an example block diagram of a computer system configured with a processor and related storage to execute different methods according to embodiments herein.

FIG. 4 is a block diagram of an example architecture of a respective computer system 110 such as one or more computers, processes, etc., for implementing a content editor 140 according to embodiments herein. Computer system 110 can include computerized devices such as personal computers, servers that make up a website, workstations, portable computing devices, consoles, network terminals, networks, processing devices, etc.

In FIG. 4, computer system 110 is shown connected to display monitor 130 for displaying a graphical user interface 133 for a user 106 to select image parameters and thresholds, using input device 116, and to view edited image content. Repository 181 can optionally be used for storing unprocessed images, processed images, color parameters, and the like.

Note that the following discussion provides a basic embodiment indicating how to carry out functionality associated with the content editor 140 as discussed above and below. However, it should be noted that the actual configuration for carrying out the content editor 140 can vary depending on a respective application. For example, as previously discussed, computer system 110 can include one or multiple computers that carry out the processing as described herein.

As shown, computer system 110 of the present example includes an interconnect 111 that couples a memory system 112, a processor 113, I/O interface 114, and a communications interface 115.

I/O interface 114 provides connectivity to peripheral devices such as pointing device 116 and other devices (if such devices are present) such as a keyboard, a selection tool to move a cursor, display screen, etc.

Communications interface 115 enables the content editor 140 of computer system 110 to communicate over a network and, if necessary, retrieve any data required to create views, process image data, communicate with a user, etc. according to embodiments herein.

As shown, memory system 112 is encoded with content editor application 140-1 that supports functionality as discussed above and as discussed further below. Content editor application 140-1 (and/or other resources as described herein) can be embodied as software code such as data and/or logic instructions that supports processing functionality according to different embodiments described herein.

During operation of one embodiment, processor 113 accesses memory system 112 via the use of interconnect 111 in order to launch, run, execute, interpret or otherwise perform the logic instructions of the content editor application 140-1. Execution of the content editor application 140-1 produces processing functionality in content editor process 140-2. In other words, the content editor process 140-2 represents one or more portions of the content editor 140 performing within or upon the processor 113 in the computer system 110.

It should be noted that, in addition to the content editor process 140-2 that carries out method operations as discussed herein, other embodiments herein include the content editor application 140-1 itself (i.e., the un-executed or non-performing logic instructions and/or data). The content editor application 140-1 may be stored on a tangible computer readable medium or any other computer readable media such as floppy disk, hard disk, optical medium, etc. According to other embodiments, the content editor application 140-1 can also be stored in a memory type system such as in firmware, read only memory (ROM), or, as in this example, as executable code within the memory system 1012.

In addition to these embodiments, it should also be noted that other embodiments herein include the execution of the content editor application 140-1 in processor 113 as the content editor process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with content editor 140 will now be discussed via flowcharts in FIGS. 5 through 9. For purposes of the following discussion, the content editor 140 or other appropriate entity performs steps in the flowcharts.

Figure 5:
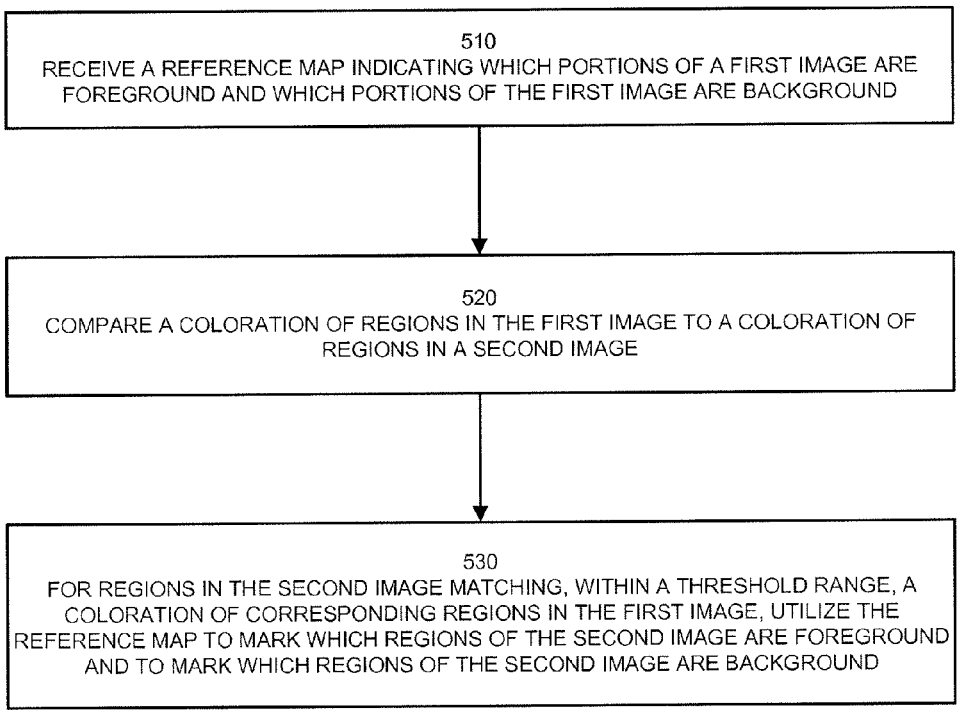
FIG. 5 is a flowchart illustrating an example of a method supporting image processing according to embodiments herein.

More particularly, FIG. 5 is an example flowchart 500 illustrating operations associated with content editor according to embodiments herein. Note that flowchart 500 of FIG. 5 and corresponding text below may overlap with, refer to, and expand on some of the matter previously discussed with respect to FIGS. 1-4. Also, note that the steps in the below flowcharts need not always be executed in the order shown.

In step 510, the content editor 140 receives a reference map 147 indicating which portions of a first image 141 are foreground and which portions of the first image 141 are background.

In step 520, the content editor 140 compares a coloration of regions in the first image 141 to a coloration of regions in a second image 142.

In step 530, for regions in the second image matching, within a threshold range, a coloration of corresponding regions in the first image 141, the content editor 140 uses the reference map 147 to mark which regions of the second image 142 are foreground and to mark which regions of the second image are background.

Figure 6:
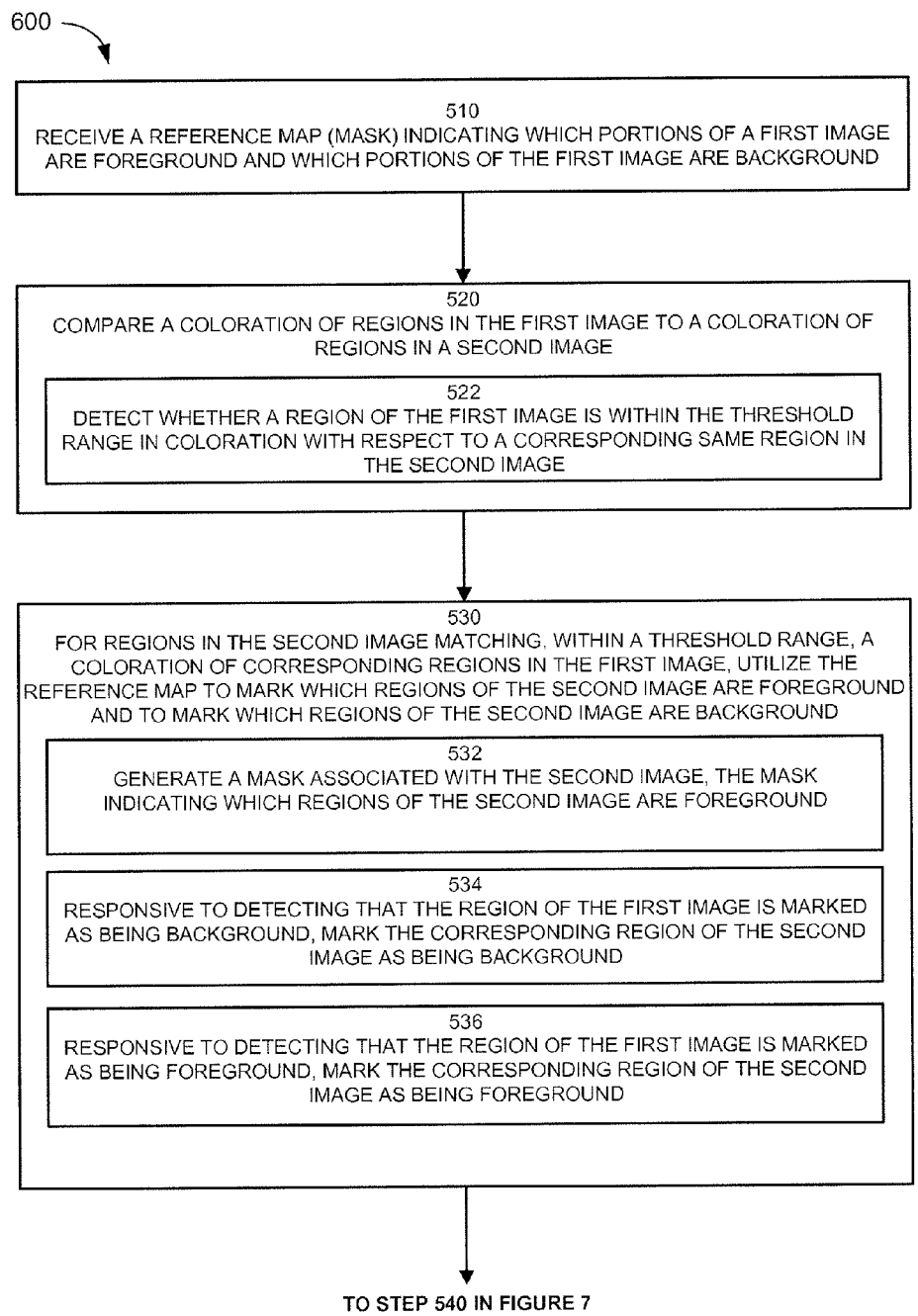
FIGS. 6 and 7 combine to form a flowchart illustrating an example of a method of image processing according to embodiments herein.
Figure 7:
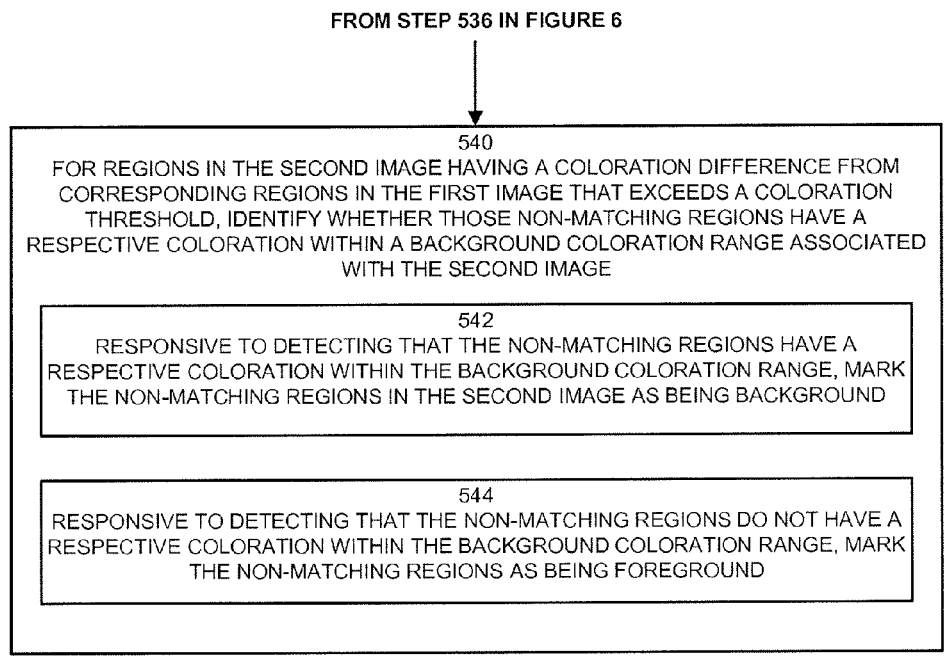

FIG. 6 is an example flowchart 600 that expands on flowchart 500 by illustrating operations associated with a content editor according to embodiments herein.

In step 510, the content editor 140 receives a reference map (mask) indicating which portions of a first image are foreground and which portions of the first image are background. Such a reference map can indicate which portions of a first image are foreground and which portions of the first image are background is responsive to comparing color parameters derived from the first image with color parameters derived from the second image and having a color parameter difference below a predefined threshold. Upon comparing color parameters derived from the first image with color parameters derived from the second image and having a color parameter difference above a predefined threshold, content editor 140 receives a reference map indicating which portions of the second image are foreground and which portions of the second image are background.

An alternative to content editor 140 receiving a pre-calculated reference map, is that content editor 140 calculates or generates the reference map from the first image. Content editor 140 analyzes the first image to identify regions as foreground and background depending on whether regions in the first image fall within a background color range, and calculates an area for each region marked as foreground. Content editor 140 removes artifacts from the first image by marking foreground regions as background for each region marked as foreground and having an area smaller than a predetermined threshold size.

In step 520, the content editor 140 compares a coloration of regions in the first image to a coloration of regions in a second image.

In step 522, the content editor 140 detects whether a region of the first image is within the threshold range in coloration with respect to a corresponding same region in the second image. Similarly, content editor 140 can compare the coloration of regions in the first image to a coloration of regions in a second image to detect that the first image is substantially similar to the second image.

In step 530, for regions in the second image matching, within a threshold range, a coloration of corresponding regions in the first image, the content editor 140 uses the reference map to mark which regions of the second image are foreground and to mark which regions of the second image are background. Alternatively, content editor 140 uses the reference map generated from the first image to remove artifacts in the second image.

In step 532, the content editor 140 generates a mask associated with the second image, the mask indicating which regions of the second image are foreground.

In step 534, responsive to detecting that the region of the first image is marked as being background, the content editor 140 marks the corresponding region of the second image as being background.

In step 536, responsive to detecting that the region of the first image is marked as being foreground, the content editor 140 marks the corresponding region of the second image as being foreground. Additionally, content editor 140 can apply the reference map to each of multiple images in a sequence of images to mark which regions of each subsequent image in the sequence are foreground and to mark which regions are background, the sequence of images including the second image as well as other images.

In step 540, for regions in the second image having a coloration difference from corresponding regions in the first image that exceeds a coloration threshold, content editor 140 identifies whether those non-matching regions have a respective coloration within a background coloration range associated with the second image.

In step 542, responsive to detecting that the non-matching regions have a respective coloration within the background coloration range, the content editor 140 marks the non-matching regions in the second image as being background.

In step 544, responsive to detecting that the non-matching regions do not have a respective coloration within the background coloration range, the content editor 140 marks the non-matching regions as being foreground. Content editor 140 and then use a mask to identify portions of the second image to overlay on another image, such as a desired background scene.

Figure 8:
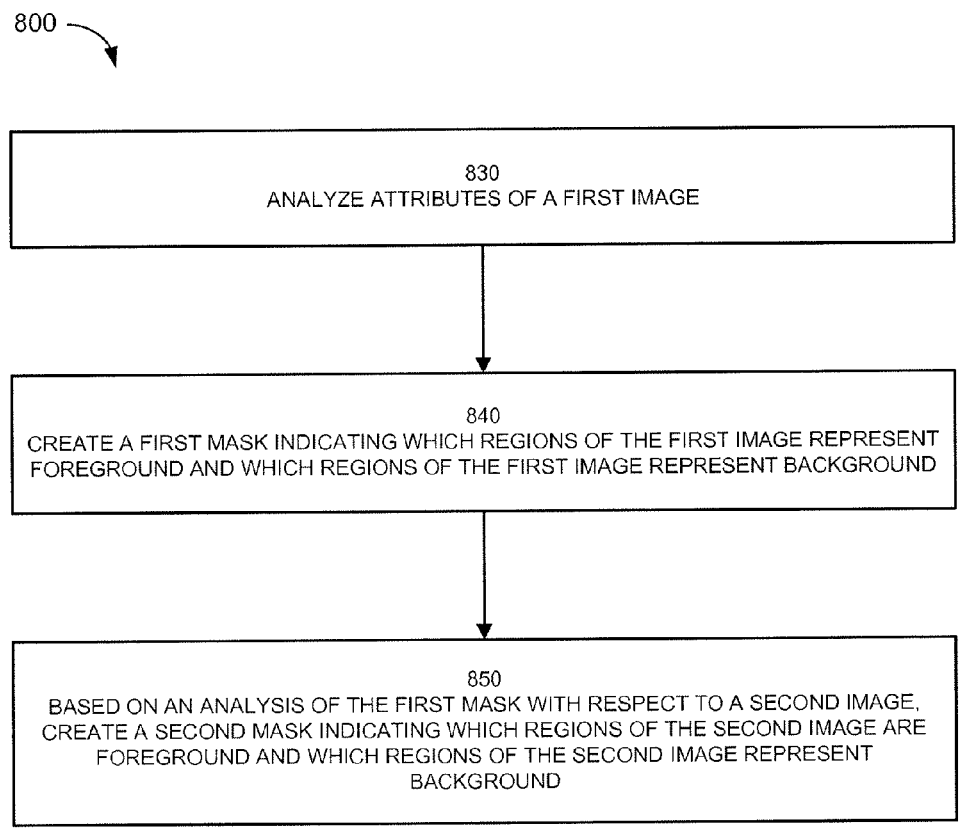
FIG. 8 is a flowchart illustrating an example of a method supporting image processing according to embodiments herein.

FIG. 8 is an example flowchart 800 illustrating operations associated with a content editor according to embodiments herein.

In step 830, the content editor 140 analyzes attributes of a first image.

In step 840, the content editor 140 creates a first mask indicating which regions of the first image represent foreground and which regions of the first image represent background.

In step 850, based on an analysis of the first mask with respect to a second image, the content editor 140 creates a second mask indicating which regions of the second image are foreground and which regions of the second image represent background.

Figure 9:
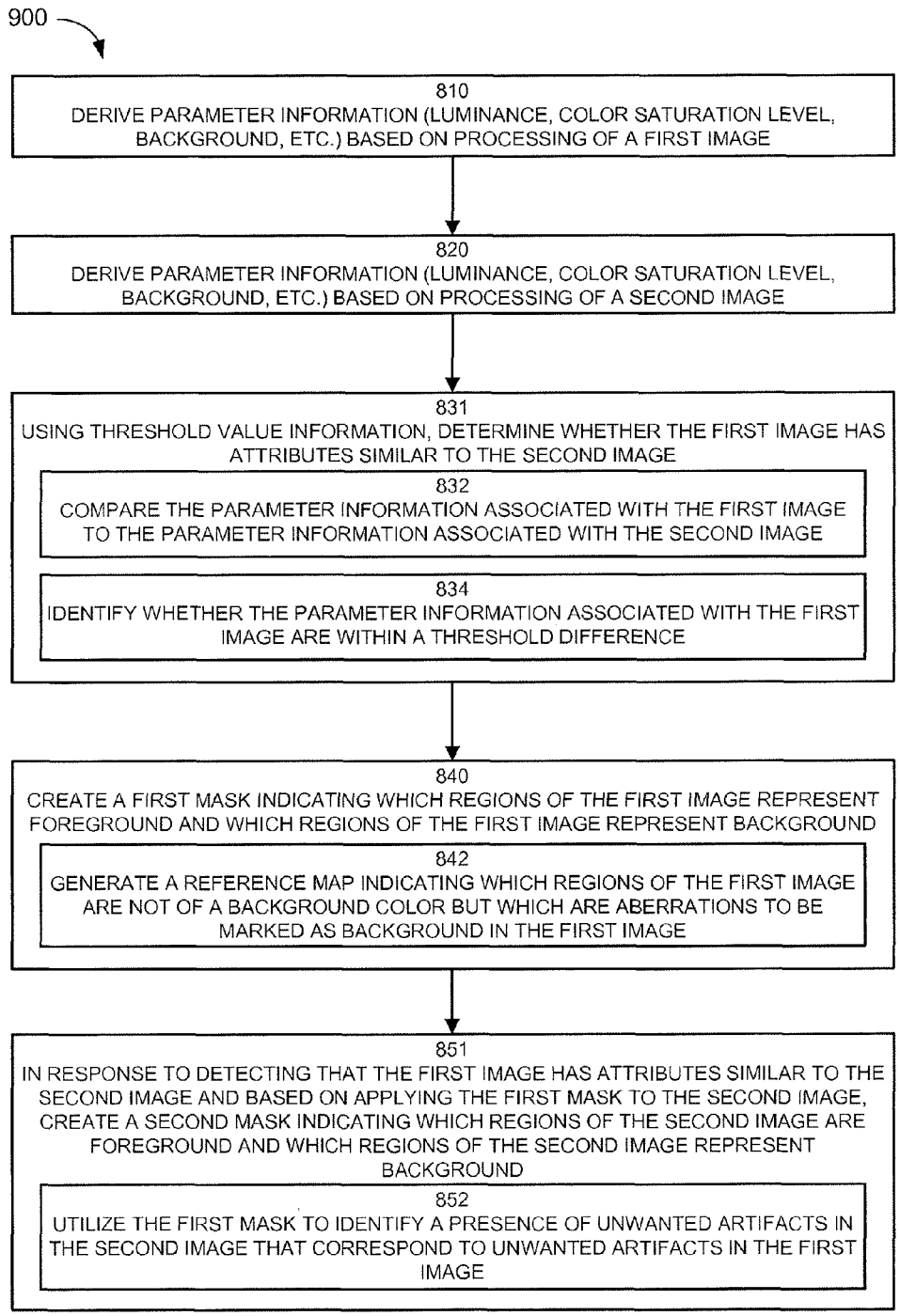
FIG. 9 is a flowchart illustrating an example of a method supporting image processing according to embodiments herein.

FIG. 9 is an example flowchart 900 that expands on flowchart 800 by illustrating operations associated with a content editor according to embodiments herein.

In step 810, the content editor 140 derives parameter information (luminance, color saturation level, background, etc.) Based on processing of a first image.

In step 820, the content editor 140 derives parameter information (luminance, color saturation level, background, etc.) Based on processing of a second image.

In step 831, using threshold value information, content editor 140 determines whether the first image has attributes similar to the second image.

In step 832, the content editor 140 compares the parameter information associated with the first image to the parameter information associated with the second image.

In step 834, the content editor 140 identifies whether the parameter information associated with the first image are within a threshold difference.

In step 840, the content editor 140 creates a first mask indicating which regions of the first image represent foreground and which regions of the first image represent background.

In step 842, the content editor 140 generates a reference map indicating which regions of the first image are not of a background color but which are aberrations to be marked as background in the first image. Alternatively, in creating the first mask, for a first set of regions of the first image that fall within a background color range, the content editor 140 marks the first set of regions in the mask as being part of the background of the first image. Also, in creating the first mask, for a second set of regions of the first image that include a contiguous grouping of pixels that fall outside the background color range and form an area smaller than a threshold value, content editor 140 marks the second set of regions in the first mask as being part of the background of the first image.

In step 851, in response to detecting that the first image has attributes similar to the second image and based on applying the first mask to the second image, content editor 140 creates a second mask indicating which regions of the second image are foreground and which regions of the second image represent background.

In step 852, content editor 140 uses the first mask to identify a presence of aberrations or artifacts in the second image that correspond to aberrations artifacts in the first image.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
    analyzing attributes of a first image;
    based on the analyzing, creating a first mask indicating which regions of the first image represent foreground and which regions of the first image represent background; and
    based on an analysis of the first mask with respect to a second image, creating a second mask indicating which regions of the second image represent foreground and which regions of the second image represent background; and
    wherein creating the first mask includes indicating which regions of the first image are not of a background color but which are aberrations to be considered part of the background; and
    wherein creating the second mask includes utilizing the first mask to identify a presence of aberrations in the second image.

2. The method of claim 1 further comprising:
    analyzing attributes of the second image to determine whether the first image has attributes similar to the second image; and
    wherein applying the first mask occurs in response to detecting that the first image has attributes similar to the second image.

3. The method of claim 2 further comprising:
    deriving parameter information based on processing of the first image;
    deriving parameter information based on processing of the second image; and
    wherein detecting that the first image is similar to the second image includes:
    comparing the parameter information associated with the first image to the parameter information associated with the second image; and
    identifying that the parameter information associated with the first image are within a threshold difference.

4. The method of claim 1, wherein creating the first mask includes:
    for a first set of regions of the first image that fall within a background color range, marking the first set of regions in the mask as being part of the background of the first image;
    for a second set of regions of the first image that include a contiguous grouping of pixels that fall outside the background color range and form an area smaller than a threshold value, marking the second set of regions in the first mask as being part of the background of the first image.

5. A system comprising:
    a processor;
    a memory unit; and
    an interconnect coupling the processor and the memory unit, the processor configured to:
    analyze attributes of a first image;
    based on the analyzing, create a first mask indicating which regions of the first image represent foreground and which regions of the first image represent background; and
    based on an analysis of the first mask with respect to a second image, create a second mask indicating which regions of the second image represent foreground and which regions of the second image represent background; and
    wherein the processor is further configured to create the first mask includes the processor configured to indicate which regions of the first image are not of a background color but which are aberrations to be considered part of the background; and
    wherein the processor is further configured to create the second mask includes the processor configured to utilize the first mask to identify a presence of aberrations in the second image.

6. The system of claim 5 wherein the processor is further configured to:
    analyze attributes of the second image to determine whether the first image has attributes similar to the second image; and wherein the processor is further configured to apply the first mask occurs in response to detecting that the first image has attributes similar to the second image.

7. The system of claim 6 wherein the processor is further configured to:
derive parameter information based on processing of the first image;
derive parameter information based on processing of the second image; and
wherein the processor is further configured to detect that the first image is similar to the second image includes:
the processor configured to compare the parameter information associated with the first image to the parameter information associated with the second image; and
the processor configured to identify that the parameter information associated with the first image are within a threshold difference.

8. A system comprising:
processor;
a memory unit; and
an interconnect coupling the processor and the memory unit, the processor configured to:
analyze attributes of a first image;
based on the analyzing, create a first mask indicating which regions of the first image represent foreground and which regions of the first image represent background; and
based on an analysis of the first mask with respect to a second image, create a second mask indicating which regions of the second image represent foreground and which regions of the second image represent background; and
wherein the processor is further configured to create the first mask includes:
the processor configured to, for a first set of regions of the first image that fall within a background color range, mark the first set of regions in the mask as being part of the background of the first image;
the processor configured to, for a second set of regions of the first image that include a contiguous grouping of pixels that fall outside the background color range and form an area smaller than a threshold value, mark the second set of regions in the first mask as being part of the background of the first image.

9. The system of claim 8 wherein the processor is further configured to:
analyze attributes of the second image to determine whether the first image has attributes similar to the second image; and
wherein the processor is configured to apply the first mask occurs in response to detecting that the first image has attributes similar to the second image.

10. The system of claim 9 wherein the processor is further configured to:
derive parameter information based on processing of the first image;
derive parameter information based on processing of the second image; and
wherein the processor is further configured to detect that the first image is similar to the second image includes:
the processor configured to compare the parameter information associated with the first image to the parameter information associated with the second image; and
the processor configured to identify that the parameter information associated with the first image are within a threshold difference.

* * * * *